United States Patent
Kuo

(10) Patent No.: US 9,126,647 B2
(45) Date of Patent: Sep. 8, 2015

(54) BICYCLE SEAT POST STRUCTURE

(71) Applicant: Frank Kuo, Taipei (TW)

(72) Inventor: Frank Kuo, Taipei (TW)

(73) Assignee: Taiwan Hodaka Industrial Co., Ltd., Taipei (TW)

( * ) Notice: Subject to any disclaimer, the term of this patent is extended or adjusted under 35 U.S.C. 154(b) by 472 days.

(21) Appl. No.: 13/753,594

(22) Filed: Jan. 30, 2013

(65) Prior Publication Data

US 2014/0208933 A1    Jul. 31, 2014

(51) Int. Cl.
     *B62J 1/08*    (2006.01)
     *F16F 9/00*    (2006.01)

(52) U.S. Cl.
     CPC ... *B62J 1/08* (2013.01); *F16F 9/00* (2013.01); *B62J 2001/085* (2013.01)

(58) Field of Classification Search
     CPC .............................. B62J 2001/085; B62J 1/08
     USPC ................... 91/43; 297/344.19; 248/157, 161
     See application file for complete search history.

(56) References Cited

U.S. PATENT DOCUMENTS

| | | | |
|---|---|---|---|
| 7,845,602 B1 * | 12/2010 | Young et al. ............... | 248/125.8 |
| 8,328,454 B2 * | 12/2012 | McAndrews et al. ...... | 403/109.7 |
| 8,398,104 B2 * | 3/2013 | Hsu ............................... | 280/220 |
| 8,511,655 B2 * | 8/2013 | Wu ................................ | 267/132 |
| 8,814,109 B2 * | 8/2014 | Laird et al. .................. | 248/125.8 |

FOREIGN PATENT DOCUMENTS

| | | |
|---|---|---|
| TW | 478461 U | 3/2002 |
| TW | M342324 U | 10/2008 |
| TW | 201217208 A | 5/2012 |

\* cited by examiner

*Primary Examiner* — Thomas E Lazo
(74) *Attorney, Agent, or Firm* — Alan D. Kamrath; Kamrath IP Lawfirm, P.A.

(57) ABSTRACT

The present invention relates to a bicycle seat post structure, and more particularly, to a structure provided with a hydraulic actuator within which is configured with an upper oil compartment, an intermediate oil compartment, and a lower oil compartment; the three oil compartments intercommunicate. It is characterized in that the bicycle seat post structure provides an upper valve moving simultaneously with the pin and configured between the upper oil compartment and the intermediate oil compartment; the upper valve will be closed to disconnect the upper oil compartment from the intermediate oil compartment when the pin is in a state of locking. Thus, the valve will stop moving up because it is positioned above the upper and the intermediate oil compartments and consequently controlled by the oil within the compartments, so as to stop the seat sliding upward and further to be combined with the bicycle frame as a whole.

8 Claims, 21 Drawing Sheets

BICYCLE SEAT POST STRUCTURE

BACKGROUND OF THE INVENTION

1. Field of the Invention

The present invention relates to a bicycle seat post structure, and more particularly to a structure that the bicycle seat cannot be adjusted either up or down when the seat height is set.

2. Background of the Invention

A bicycle seat post is mounted to the bottom of the seat for supporting the seat so as to be fixed to the bicycle frame. The bicycle seat post has a top end fastened to the bottom of the seat and a bottom end inserted into and secured to the seat tube of the bicycle frame. The bicycle seat post is generally disposed with mechanical adjustment mechanisms or oil hydraulic adjustment mechanisms; the bicycle seat post with mechanical adjustment mechanisms employs mechanical mechanisms to control the relative position of the inner and the outer tubes of the seat post so as to adjust the seat height; the bicycle seat post with oil hydraulic adjustment mechanisms employs the hydraulic force from hydraulic members to control the relative position of the inner and the outer tubes of the seat post so as to adjust the seat height. As disclosed in Taiwan Patent Application No. 089221346, No. 097206782, and No. 099137166, those cases provide the aforesaid bicycle seat post with oil hydraulic adjustment mechanisms. A prior art bicycle seat post with oil hydraulic adjustment mechanisms is provided with an actuator inside the seat post. The actuator includes a cylinder barrel that is arranged with a floating piston and an axial displacement valve driven by a pin, and wherein the cylinder barrel is provided with an upper oil compartment between the floating piston and the axial displacement valve, a lower oil compartment under the axial displacement valve, and an air compartment above the floating piston. When the prior art bicycle seat post with oil hydraulic adjustment mechanisms is in use and the height thereof is set and further it is locked by a pin, the oil within the upper and the lower oil compartments stops flowing and the lower oil compartment is filled with oil so as to cause the seat to stop moving down and to be fixed. In addition, the air compartment is arranged above the floating piston; when the user pulls the seat upward, consequently, the pin and the valve compresses the air within the air compartment and they simultaneously move upward with the seat, so that a sliding space between the bicycle seat and the bicycle frame is produced when the user lifts the bicycle by holding onto the seat of the bicycle. Thus, it doesn't seem to the user that the bicycle seat is combined with the bicycle frame as a whole because the bicycle seat seems disconnected from the bicycle frame in the beginning when the bicycle is lifted by holding onto the bicycle seat. It is against this background and the problems associated therewith that the present invention has been developed.

SUMMARY OF THE INVENTION

The present invention is intended to provide a bicycle seat post structure that the bicycle seat cannot be moved either up or down when the seat is in a state of locking, so as to allow the seat to be combined with the bicycle frame as a whole.

DETAILED DESCRIPTION OF EMBODIMENTS OF THE INVENTION

Figure 1:
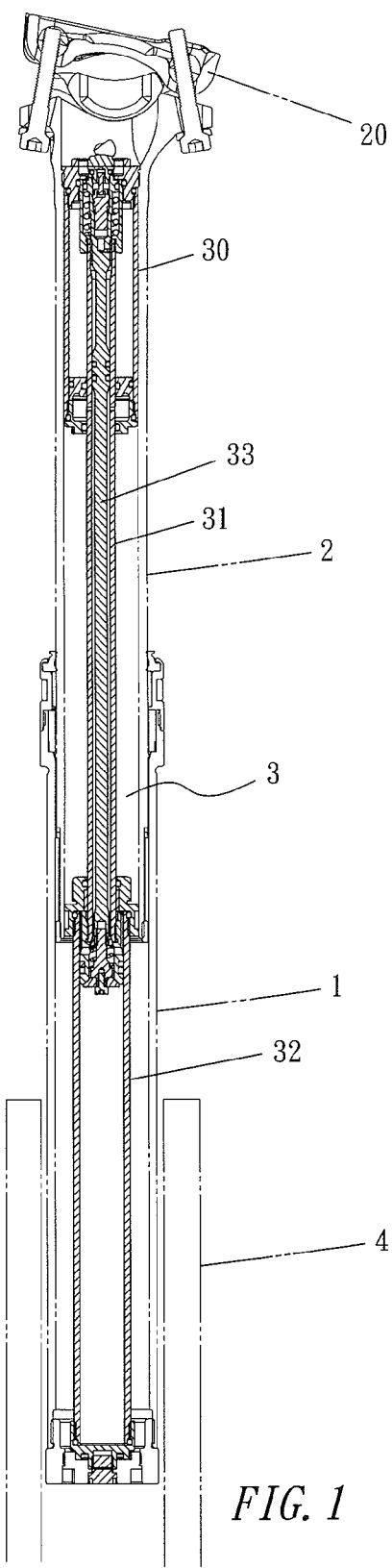
FIG. 1 is a reference picture of the assembled bicycle seat post in accordance with a first embodiment of the present invention.
Figure 2:
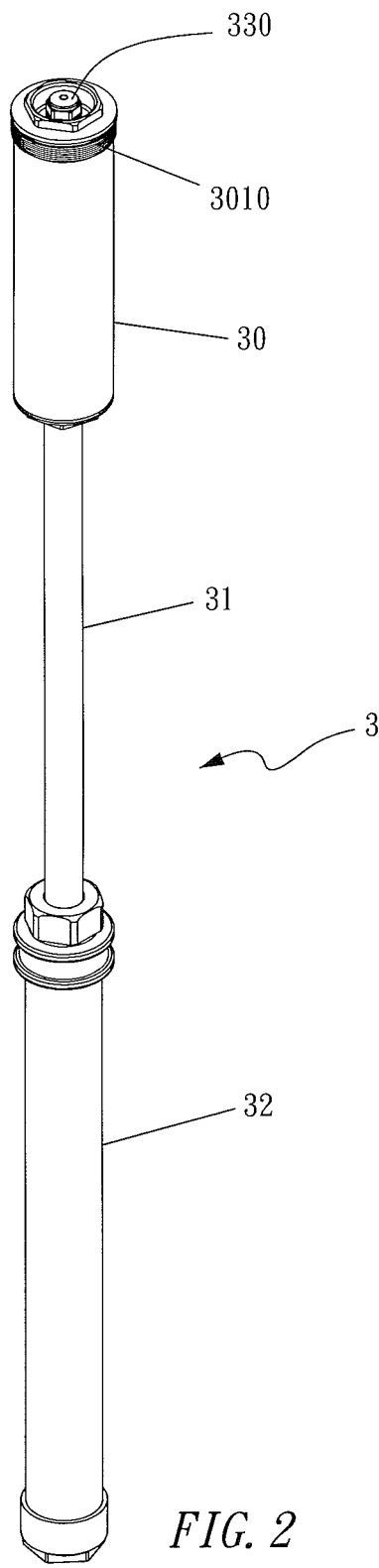
FIG. 2 is a stereogram of the hydraulic actuator in accordance with a first embodiment of the present invention.

Referring to FIG. 1, the bicycle seat post disclosed in the present invention is provided with an outer tube 1 which has a bottom end inserted into an inner tube □ arranged within the outer tube 1, and a hydraulic actuator 3 which is configured in the outer tube 1 as well as the inner tube □; wherein, the outer tube 1 has a bottom end received and secured in the seat tube 4 of the bicycle frame; and wherein the inner tube 2 has a top end configured with a clamp 20 for fastening the fixing rod disposed on the bottom end of the seat so as to tighten firmly.

Figure 3:
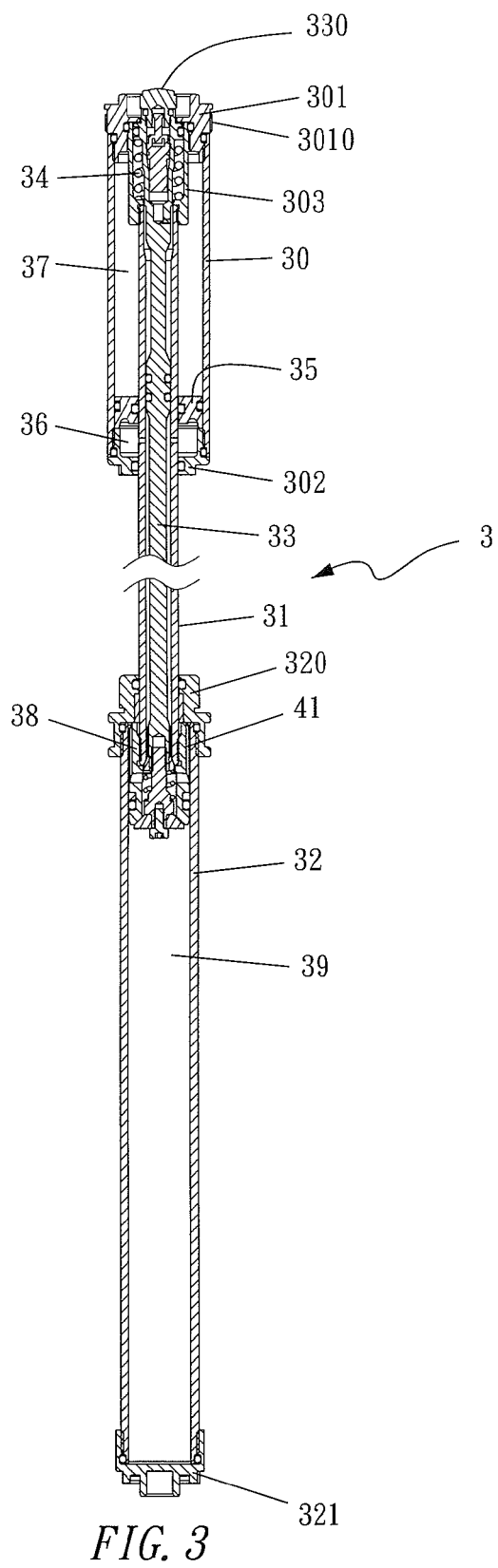
FIG. 3 is a sectional plan view of the hydraulic actuator in accordance with a first embodiment of the present invention.
Figure 4:
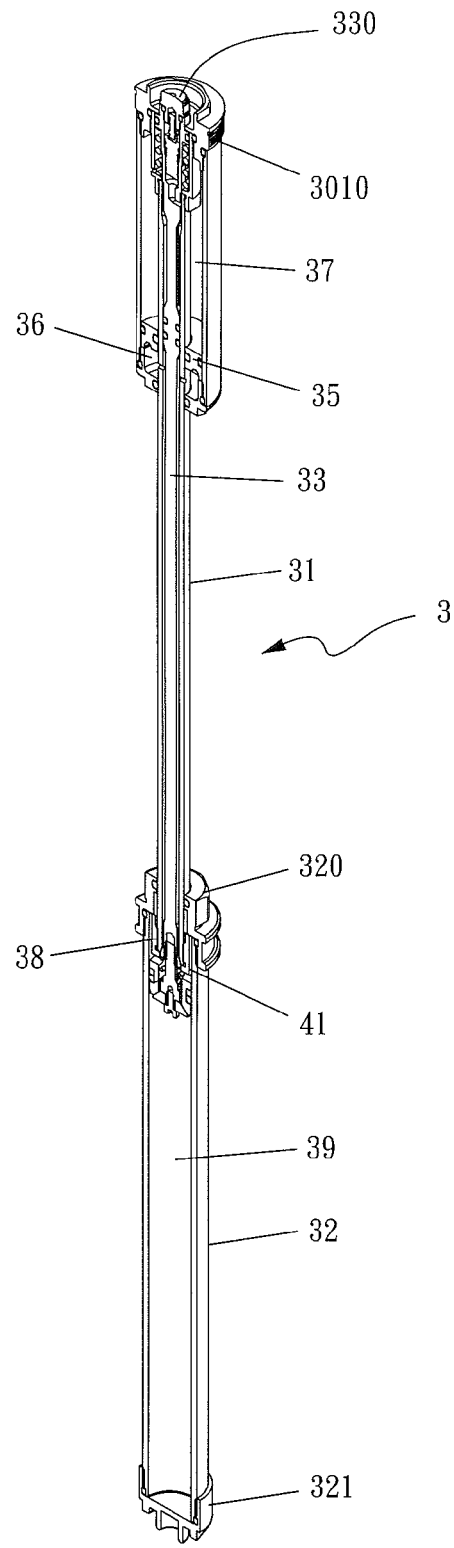
FIG. 4 is a cutaway view of the hydraulic actuator in accordance with a first embodiment of the present invention.
Figure 5:
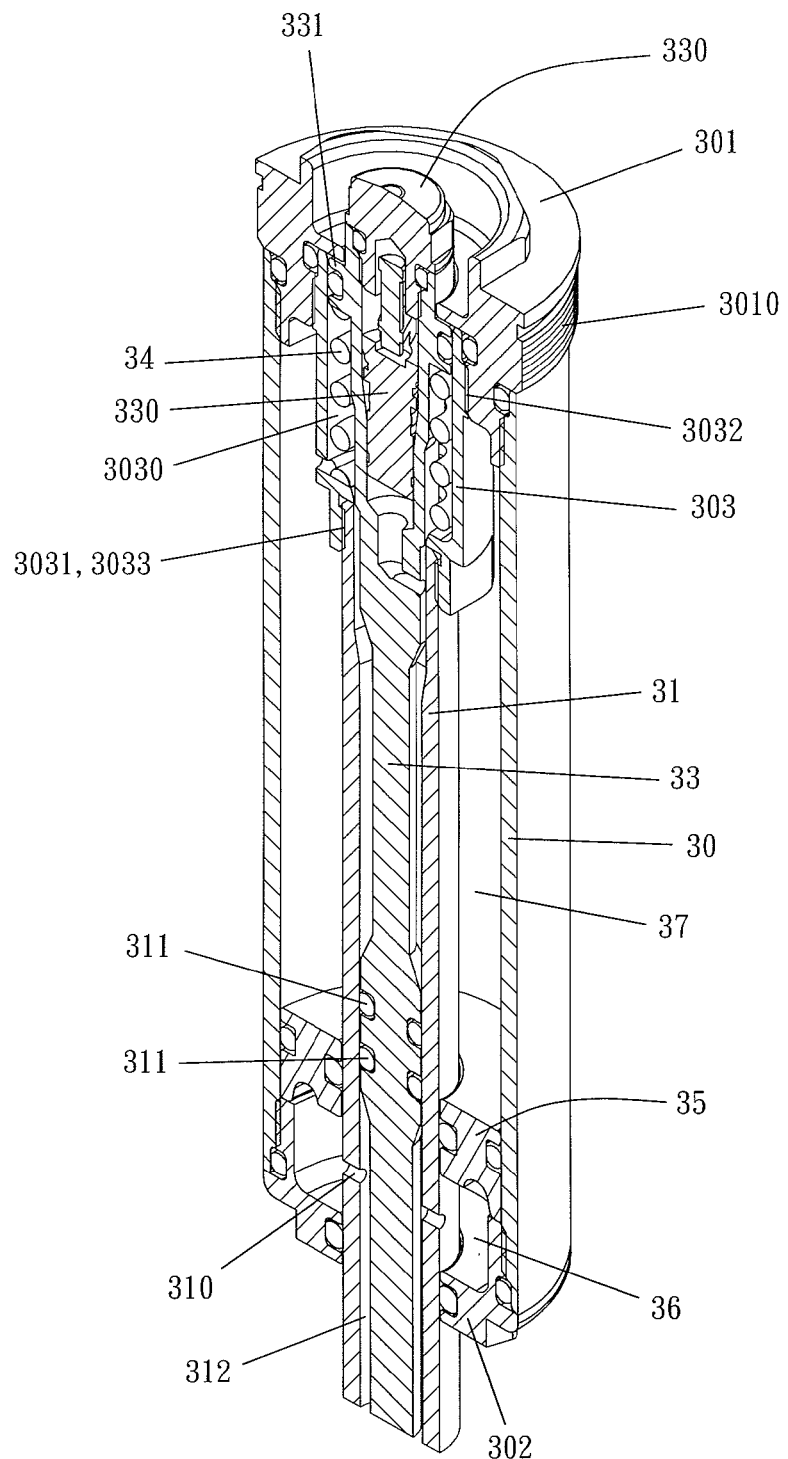
FIG. 5 is a cutaway view of the upper half of the hydraulic actuator in accordance with a first embodiment of the present invention.
Figure 6:
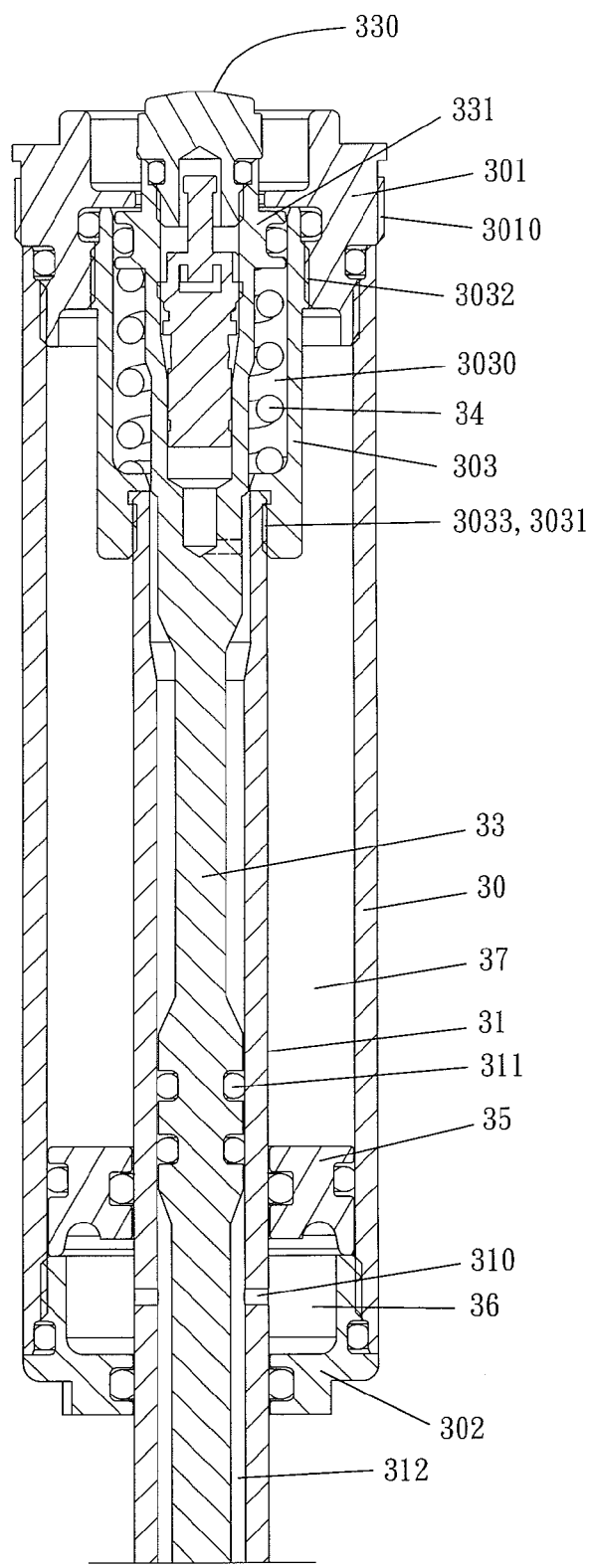
FIG. 6 is a sectional plan view of the upper half of the hydraulic actuator in accordance with a first embodiment of the present invention.
Figure 7:
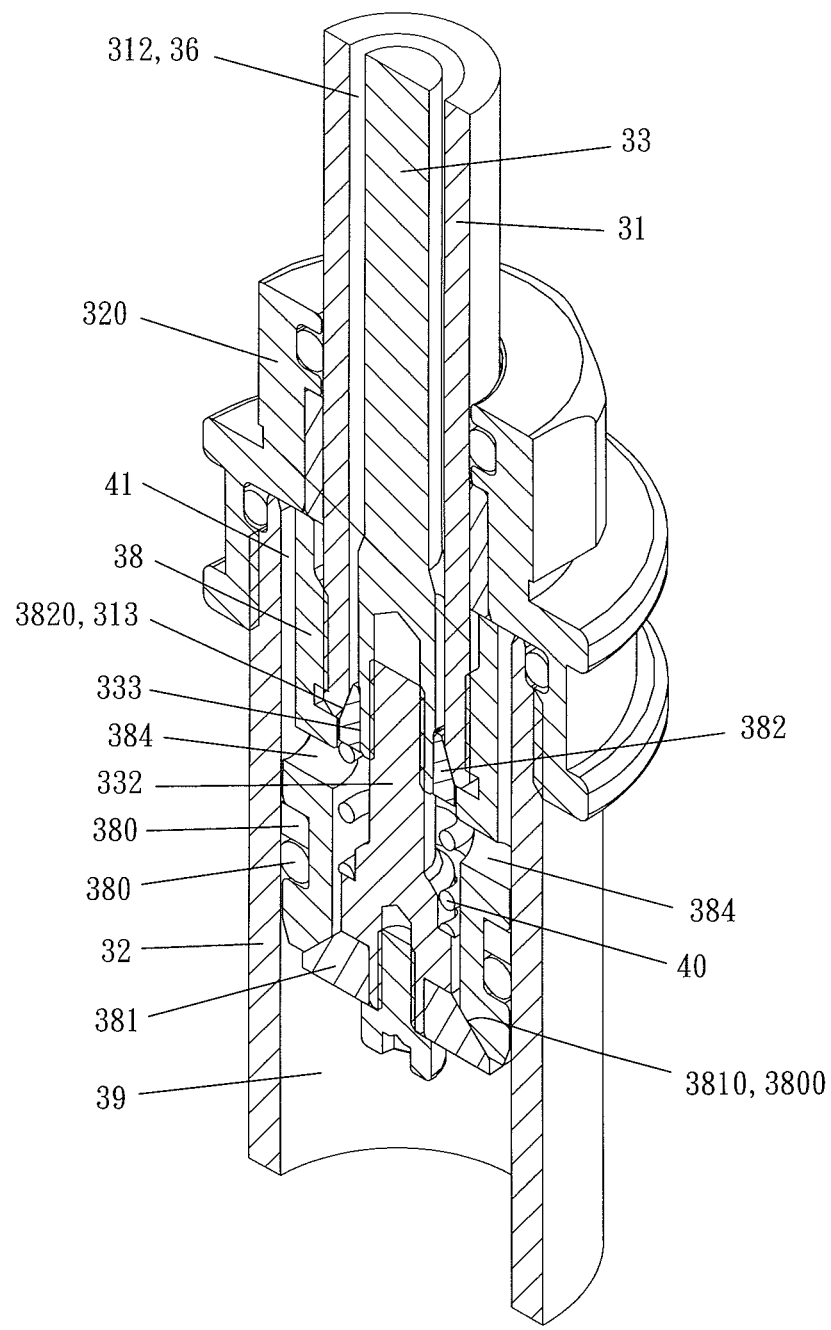
FIG. 7 is a cutaway view of the lower half of the hydraulic actuator in accordance with a first embodiment of the present invention.
Figure 8:
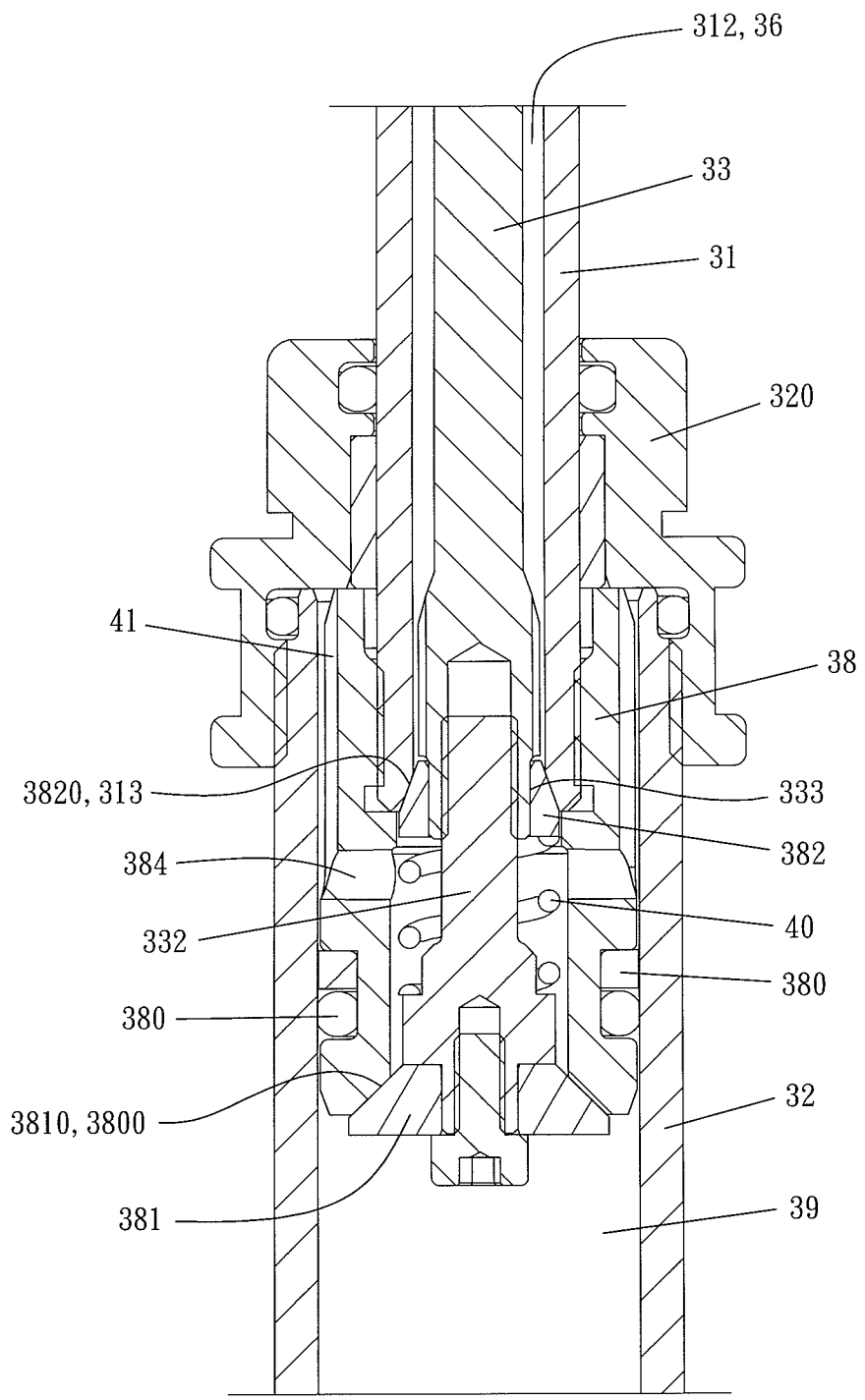
FIG. 8 is a sectional plan view of the lower half of the hydraulic actuator in accordance with a first embodiment of the present invention.

Referring to FIG. 2 to FIG. 8, the hydraulic actuator 3 includes an upper cylinder barrel 30, an intermediate cylinder barrel 31, a lower cylinder barrel 32, and a pin 33 arranged in the intermediate cylinder barrel 31. The intermediate cylinder barrel 31 is arranged between the upper cylinder barrel 30 and the lower cylinder barrel 32, and has two ends respectively inserted into the upper cylinder barrel 30 and the lower cylinder barrel 32. The upper cylinder barrel 30 has an upper opening and a lower opening respectively screwed with a first upper sealing plug 301 and a first lower sealing plug 302 which are metallic and hollow (as shown in FIG. 3 to FIG. 6). The top end of the first upper sealing plug 301 has an outer wall 3010 configured to the external side of the opening of the upper cylinder barrel 30, and said outer wall 3010 is provided with threads allowed to mate with the internal threads of the aforesaid inner tube 2 (as shown in FIG. 1) so as to fasten the top end of the upper cylinder barrel 30. The interior of the top end of the upper cylinder barrel 30 is arranged with a bearer 303 (as shown in FIG. 3 and FIG. 6) whose top surface has a concave receiving space 3030 disposed with a perforation 3031 at the middle thereof. The outer wall of the top end of the bearer 303 is engaged with the inner wall of the first upper sealing plug 301 by a threaded portion 3032, and further the inner wall of the perforation 3031 at the bottom surface of the bearer 303 is engaged with the outer wall of the top end of the intermediate cylinder barrel 31 by a threaded portion 3033, so as to allow the upper cylinder barrel 30, the first upper sealing plug 301, the bearer 303 as well as the intermediate cylinder barrel 31 to be combined into an integral whole (as shown in FIG. 5 and FIG. 6). The top end of the pin 33 is inserted into the receiving space 3030 of the bearer 303 and further secured to an upper pin 330 whose top end extends through the first sealing plug 301. The receiving space 3030 of the bearer 303 is disposed with an upper spring 34 mounted between the outer wall of the top end of the pin 33 and the inner wall of the receiving space 3030; the upper spring 34 has a top end fastened to the shoulder 331 of the top end of the pin 33 and a bottom end touching the bottom surface of the receiving space 3030 of the bearer 303, and therefore, the upper spring 34 may exert a force on the pin 33 and the upper pin 330 so as to push them to move upward. The outer side of the intermediate cylinder barrel 31 inside the upper cylinder barrel 30 is configured with a floating piston 35, as shown in FIG. 6; an upper oil compartment 36 is arranged inside the upper cylinder barrel 30 between the floating piston 35 and the first lower sealing plug 302; an air compartment 37 is arranged inside the upper cylinder barrel 30 between the top of the floating piston 35 and the first upper sealing plug 301. The wall of the intermediate cylinder barrel 31 relative to the portion beneath the floating piston 35 is provided with an oil hole 310; the outer wall of the pin 33 relative to the portion above the oil hole 310 touches the wall of the intermediate cylinder barrel 31 by first oil rings 311 so as to form an oil passage 312 between the outer wall of the pin 33 relative to the portion beneath the first oil rings 311 and the inner wall of the intermediate cylinder barrel 31; the oil passage 312 may communicate with the upper oil compartment 36 via the oil hole 310, so that the oil passage 312 is allowed to be a part of the upper oil compartment 36.

Referring to FIG. 2, FIG. 3, FIG. 7 and FIG. 8, it is the structure that the pin 33 and the bottom end of the intermediate cylinder barrel 31 are inserted into the interior of the lower cylinder barrel 32. The lower cylinder barrel 32 has an upper opening and a lower opening respectively screwed with a second upper sealing plug 320 and a second lower sealing plug 321 so as to seal the upper and the lower openings of the lower cylinder barrel 32; wherein the second upper sealing plug 320 is disposed with a perforation at the middle thereof so as to allow the bottom end of the intermediate cylinder barrel 31 to insert through and into the lower cylinder barrel 32. The bottom end of the intermediate cylinder barrel 31 inside the lower cylinder barrel 31 is screwed with a hollow valve 38 of which the outer wall touches the inner wall of the lower cylinder barrel 32 via second oil rings 380. The interior of the hollow valve 38 is arranged with a lower pin 332 attached to the pin 33; the exterior of the lower end of the lower pin 332 is secured with a lower valve 381 of which the outer side is the outer incline 3810; the bottom of the valve 38 is provided with a hollow opening of which the inner wall relative to the outer incline 3810 provides an inner incline 3800; the space positioned inside the lower cylinder barrel 32 and also under the lower valve 381 forms a lower oil compartment 39 when the inner incline 3800 and the outer incline 3810 firmly engage each other. The bottom end of the pin 33 is provided with a diameter-narrowed section 333 having a narrower outer diameter than the pin body; the outer side of the diameter-narrowed section 333 is configured with an upper valve 382 of which the outer side is arranged with an outer incline 3820; the inner side of the bottom end of the intermediate cylinder barrel 31 relative to the outer incline 3820 provides an inner incline 313. The exterior of the lower pin 332 is arranged with a lower spring 40; the lower spring 40 has a top end touching the bottom end of the upper valve 382, and a bottom end against a plane surface of the lower pin 332, and therefore, the lower spring 40 may exert a force on the upper valve 382 to push it to move upward so as to allow the outer incline 3820 of the upper valve 382 to kiss the inner incline 313 of the bottom end of the intermediate cylinder barrel 31. The outer wall of the valve 38 under the upper valve 382 is provided with a valve aperture 384 which enables the inner and outer sides of the valve 38 to intercommunicate; an intermediate oil compartment 41, which communicates with the interior of the valve 38 by the valve aperture 384, is configured between the inner wall of the lower cylinder barrel 32 and the outer wall of the valve 38 above the valve aperture 384.

After the aforesaid bicycle seat post is mounted to the seat tube of the bicycle frame, the seat height adjustments may proceed as the following.

Figure 9:
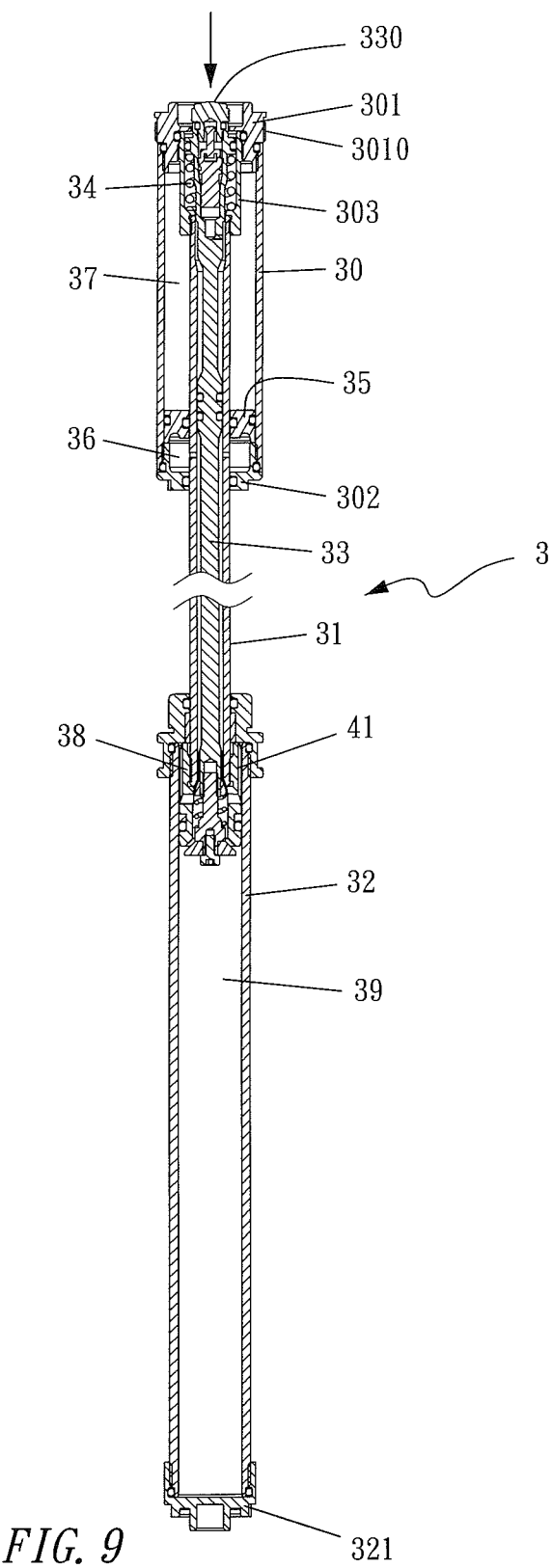
FIG. 9 is a sectional view of the hydraulic actuator in a state that the oil passages communicate with one another in accordance with a first embodiment of the present invention.
Figure 10:
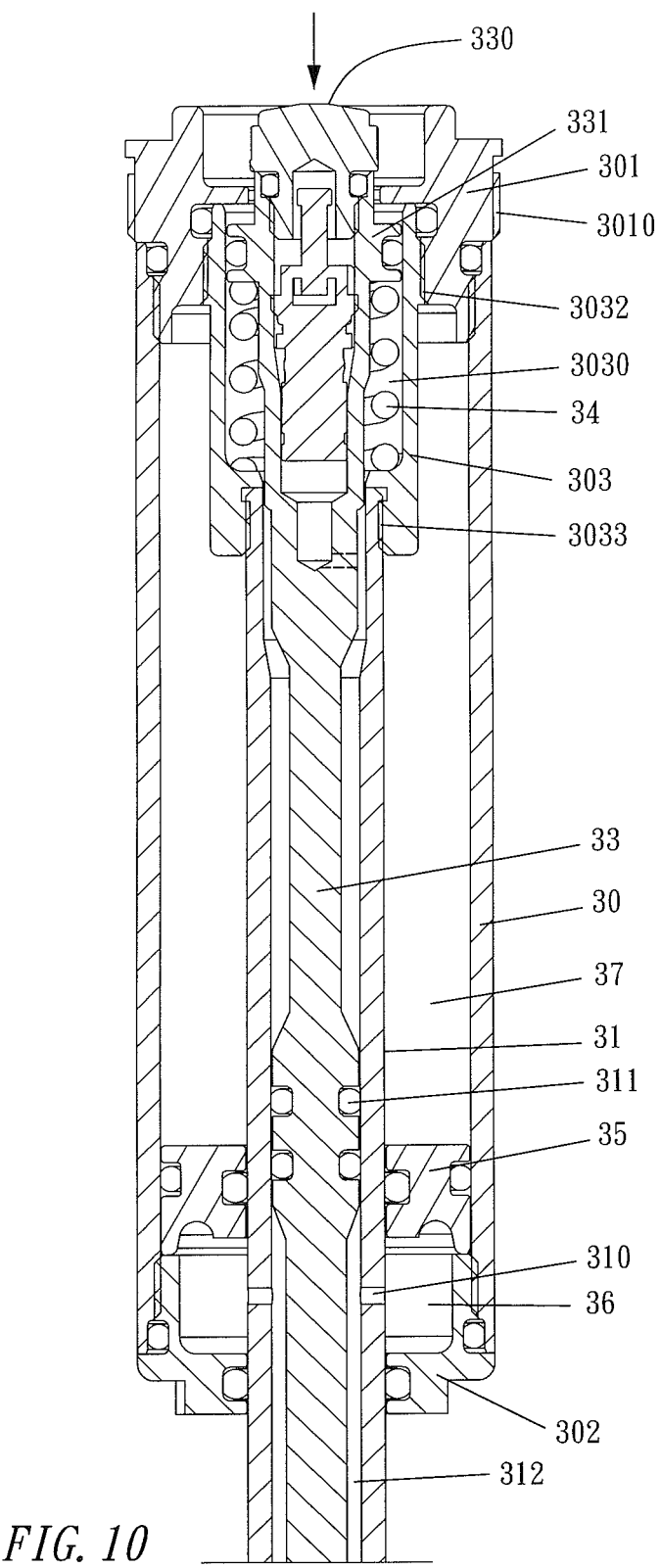
FIG. 10 is a sectional view of the upper half of the hydraulic actuator in a state that the oil passages communicate with one another in accordance with a first embodiment of the present invention.
Figure 11:
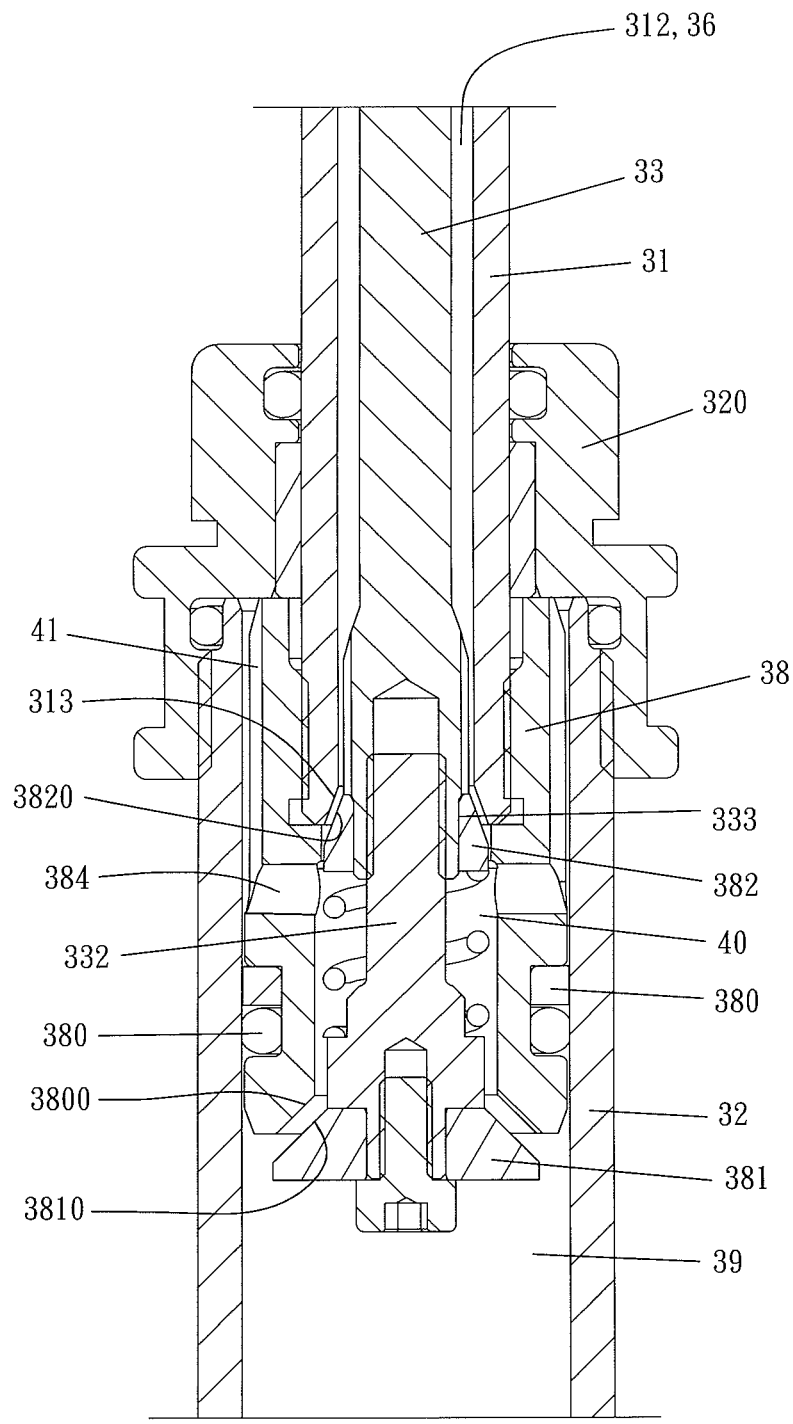
FIG. 11 is a sectional view of the lower half of the hydraulic actuator in a state that the oil passages communicate with one another in accordance with a first embodiment of the present invention.
Figure 12:
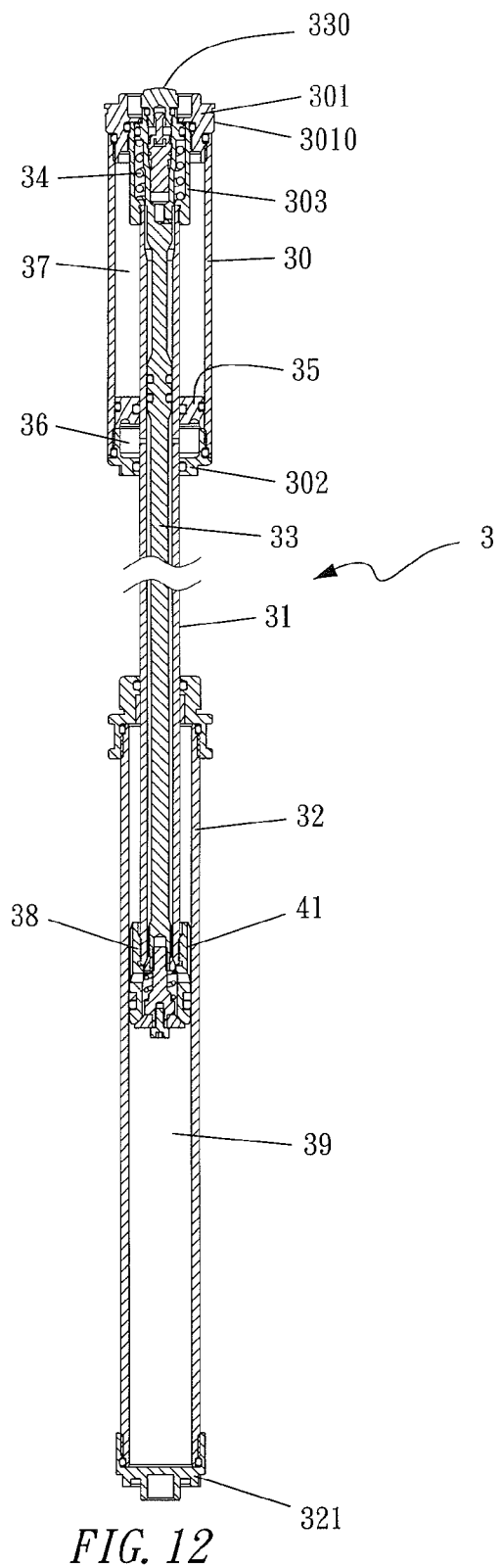
FIG. 12 is a sectional view that the hydraulic actuator performs the seat height adjustments in accordance with a first embodiment of the present invention.

I. As shown in FIG. 9 and FIG. 10, the bicycle seat height may be adjusted when the regulating knob is set to press down the upper pin 330, the pin 33 and the lower pin 332 which are arranged in the hydraulic actuator 3; when the pin 33 is pressed down, the upper spring 34 is compressed, and the pin 33 moves down so as to drive the lower pin 332 combined with the pin 33, the upper valve 382 and the lower valve 381 simultaneously to move down together; the upper valve 382 and the lower valve 381 respectively disconnect from the inner incline 313 of the intermediate cylinder barrel 31 and the inner incline 3800 of the valve 38, as shown in FIG. 11, so as to allow the upper oil compartment 36, the intermediate oil compartment 41 and the lower oil compartment 39 to communicate with one another, and thus the upper cylinder barrel 30, the intermediate cylinder barrel 31, the pin 33, the valve 38 and the seat are allowed to be simultaneously driven as a whole for height adjustments; in addition, the oil distribution in each oil compartment will vary according to the varied heights of the seat, as shown in FIG. 12.

Figure 13:
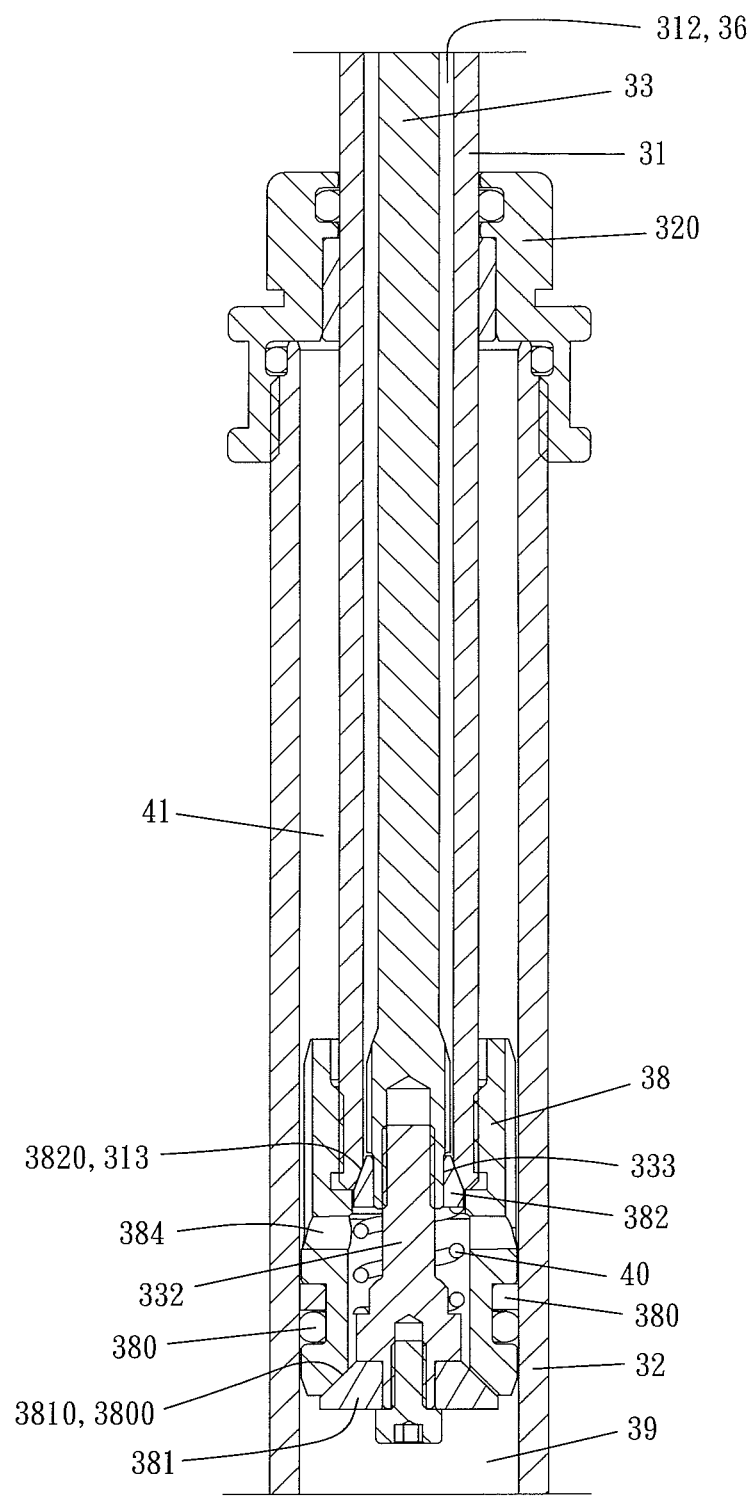
FIG. 13 is a sectional view of the lower half of the hydraulic actuator in the state of performing the seat height adjustments in accordance with a first embodiment of the present invention.

II. As shown in FIG. 13, the regulating knob may be set to stay in the state of locking after the seat height is set. The upper spring 34 pushes the pin 33 up back to its normal position so as to allow the lower valve 381 to kiss the inner incline 3800 of the valve 38 and allow the upper valve 382 to kiss the inner incline 313 of the intermediate cylinder barrel 31; in addition, the upper valve 382 is also pushed up by the lower spring 40 to firmly touch and kiss the inner incline 313 of the intermediate cylinder barrel 31; thus, the upper valve 382 and the lower valve 381 close the upper oil compartment 36, the intermediate oil compartment 41 and the lower oil compartment 39 so as to stop the oil in each compartment flowing into one another; it is because that the oil within the intermediate oil compartment 41 may prevent the valve 38, the upper valve 382 and the lower valve 381 from moving up with the pin 33, so as to cause the height of the seat to be set to stop the seat moving up and enable the seat to be firmly combined with the bicycle frame as a whole without any disconnection, when the regulating knob is set to stay in the state of locking.

According to the aforementioned, when the pin is in the state of locking, the upper valve 382 and the lower valve 381 disclosed in the present invention may close the oil compartments 36, 41 and 39 to disconnect the oil passages so as to lock the seat, and thus, the seat cannot be pushed down or pulled up so as to be firmly combined with the bicycle frame as a whole.

Figure 14:
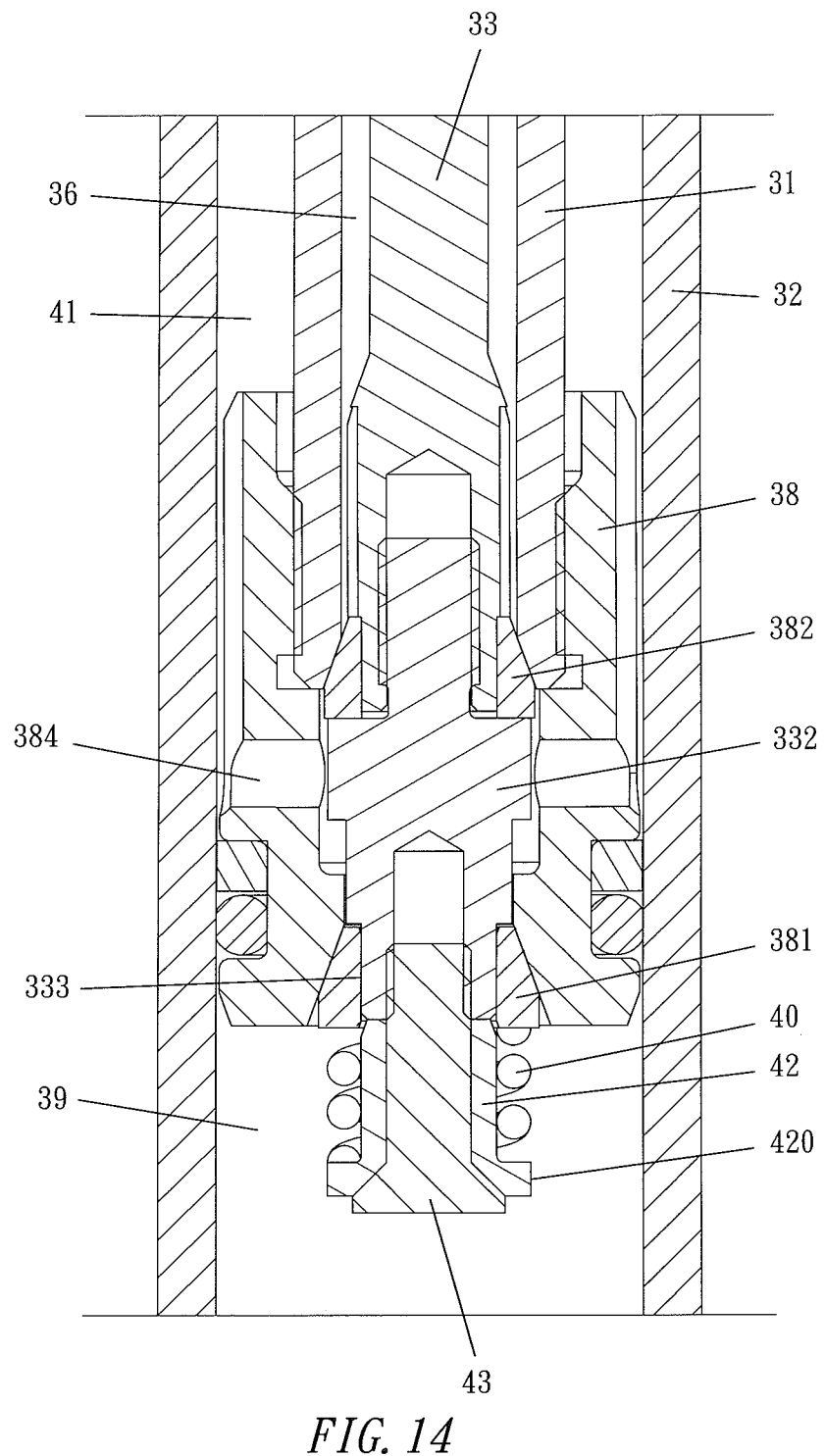
FIG. 14 is a sectional view of the lower half of the hydraulic actuator in a state that the oil passages are closed in accordance with a second embodiment of the present invention.
Figure 15:
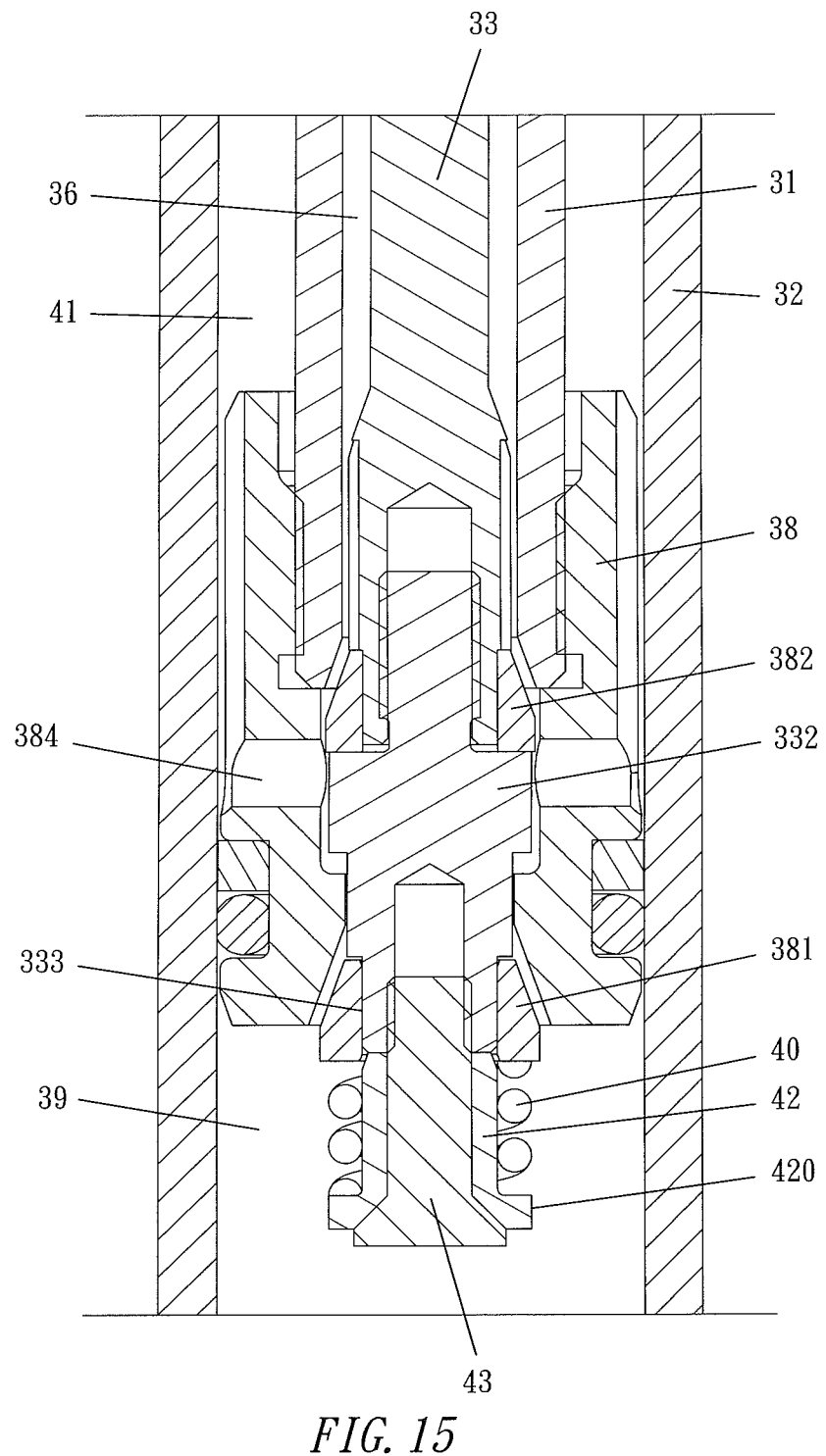
FIG. 15 is a sectional view of the lower half of the hydraulic actuator in a state that the oil passages communicate with one another in accordance with a second embodiment of the present invention.

Referring to FIG. 14 and FIG. 15, the sectional view of the lower half of the hydraulic actuator in a state that the oil passages are closed and the sectional view of the lower half of the hydraulic actuator in a state that the oil passages communicate with one another are illustrated in accordance with a second embodiment of the present invention. The differences between said second embodiment and said first embodiment illustrated in FIG. 8 will be described as follows: the upper valve 382 shown in said second embodiment is secured to the bottom end of the pin 33 so that the axial displacements cannot be carried out along the pin 33; the lower valve 381 is configured to the outer side of the diameter-narrowed section 333 of the lower pin 332; the lower spring 40 arranged under the lower valve 381 is disposed to the outer side of a spring sleeve 42; a bolt 43 of which the top end is screwed with the bottom end of the lower pin 332 passes through the middle of the spring sleeve 42 so as to enable the spring sleeve 42, the pin 33 and the lower pin 332 to be combined together and to operate simultaneously as a whole. The outer side of the bottom end of the spring sleeve 42 is provided with a protrudent ring 420 protruding outward for holding the bottom end of the lower spring 40 so as to allow the top end of the lower spring 40 to push the lower valve 381 up. When the oil passages are closed, as shown in FIG. 14, the upper valve 382 and the lower valve 381 close the oil compartments 36, 41 and 39 so as to stop the oil in each compartment flowing into one another. When the regulating knob is driven to push down the upper pin 330, the pin 33, the lower pin 332 and the spring sleeve 42 within the hydraulic actuator 3, the bicycle seat height is allowed to be adjusted; when the pin 33 is pushed down, the upper spring 34 is compressed, and the pin 33 moves down, so as to drive the lower pin 332 combined with the pin 33, the upper valve 382 and the lower valve 381 simultaneously to move down together; the upper valve 382 and the lower valve 381 respectively disconnect from the inner incline 313 of the intermediate cylinder barrel 31 and the inner incline 3800 of the valve 38, as shown in FIG. 15, so that the upper oil compartment 36, the intermediate oil compartment 41 and the lower oil compartment 39 are allowed to communicate with one another for seat height adjustments.

Figure 16:
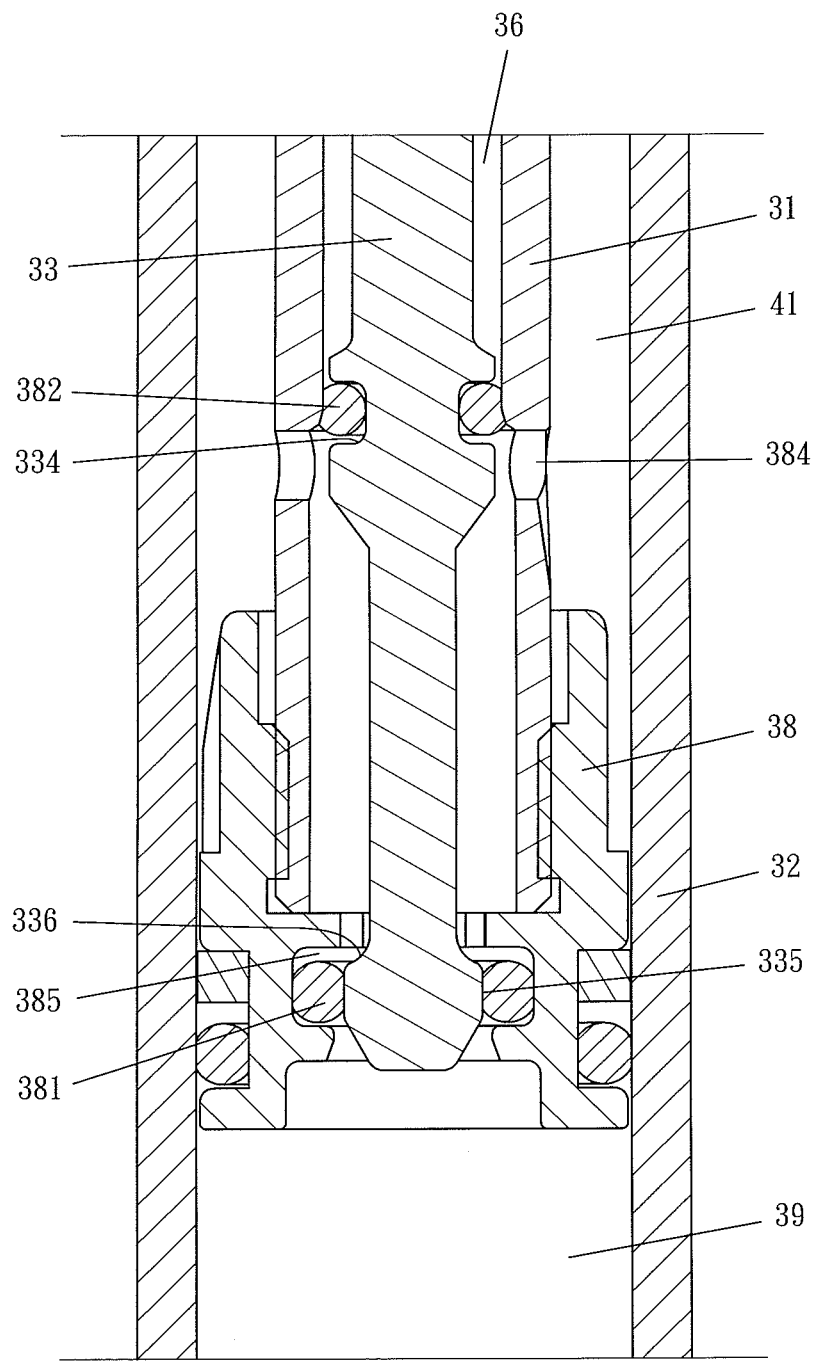
FIG. 16 is a sectional view of the lower half of the hydraulic actuator in a state that the oil passages are closed in accordance with a third embodiment of the present invention.
Figure 17:
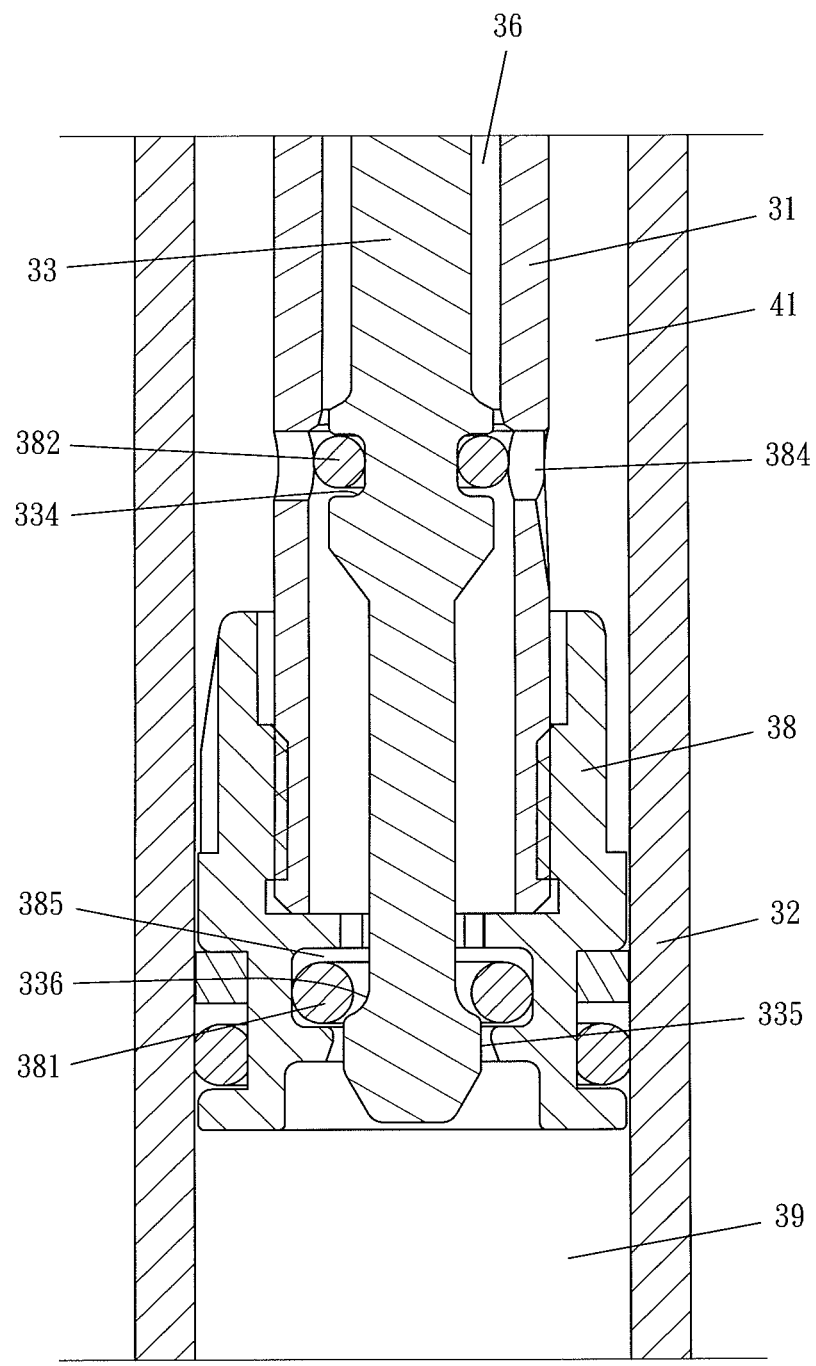
FIG. 17 is a sectional view of the lower half of the hydraulic actuator in a state that the oil passages communicate with one another in accordance with a third embodiment of the present invention.
Figure 18:
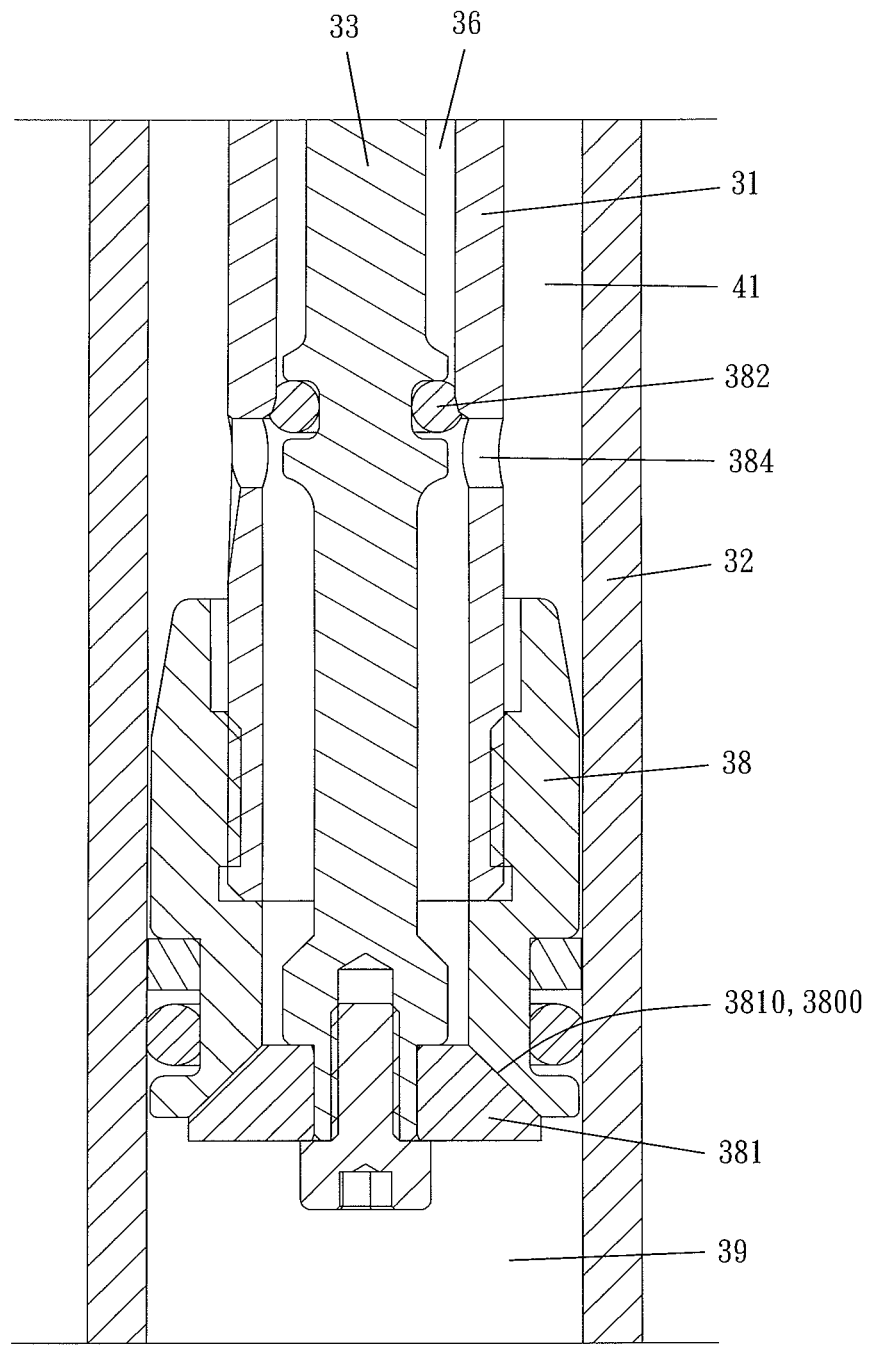
FIG. 18 is a sectional view of the lower half of the hydraulic actuator in a state that the oil passages are closed in accordance with a fourth embodiment of the present invention.
Figure 19:
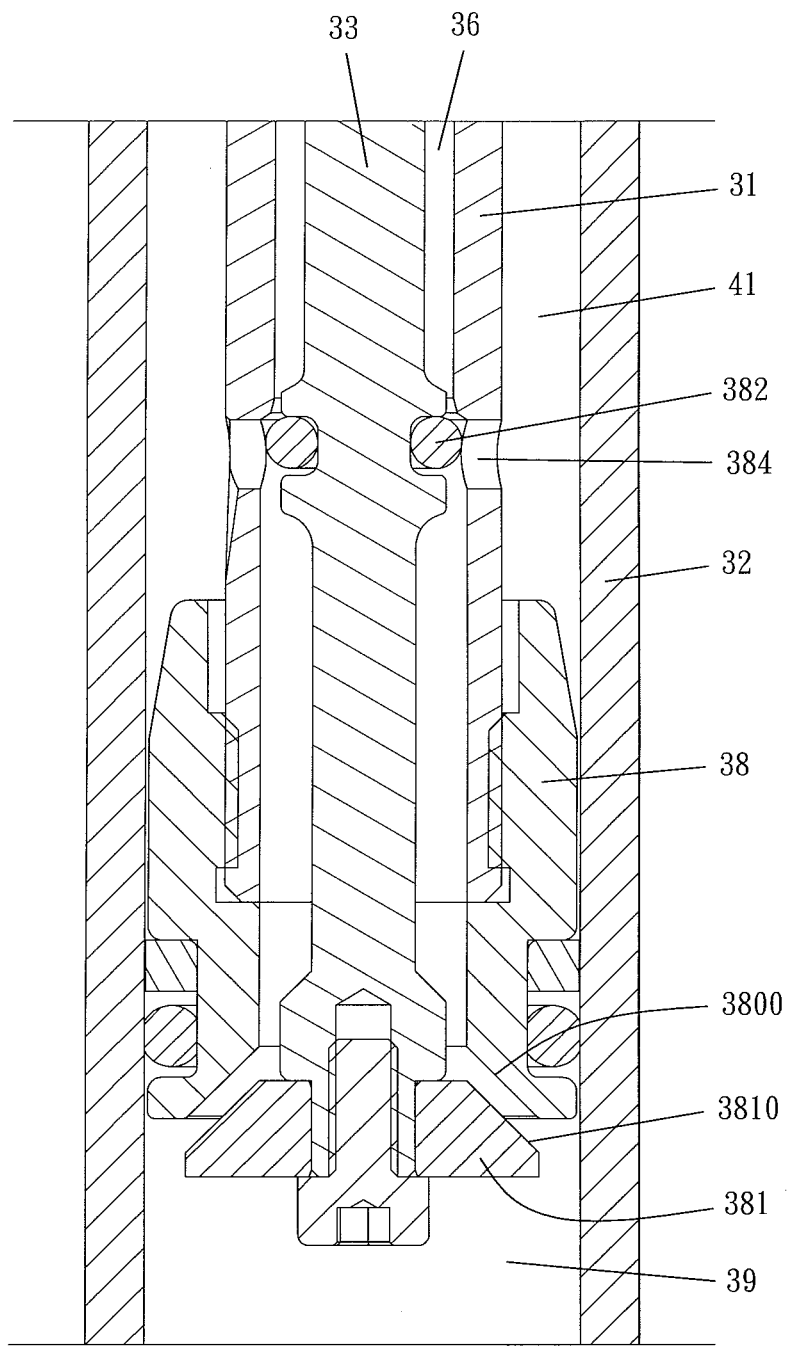
FIG. 19 is a sectional view of the lower half of the hydraulic actuator in a state that the oil passages communicate with one another in accordance with a fourth embodiment of the present invention.
Figure 20:
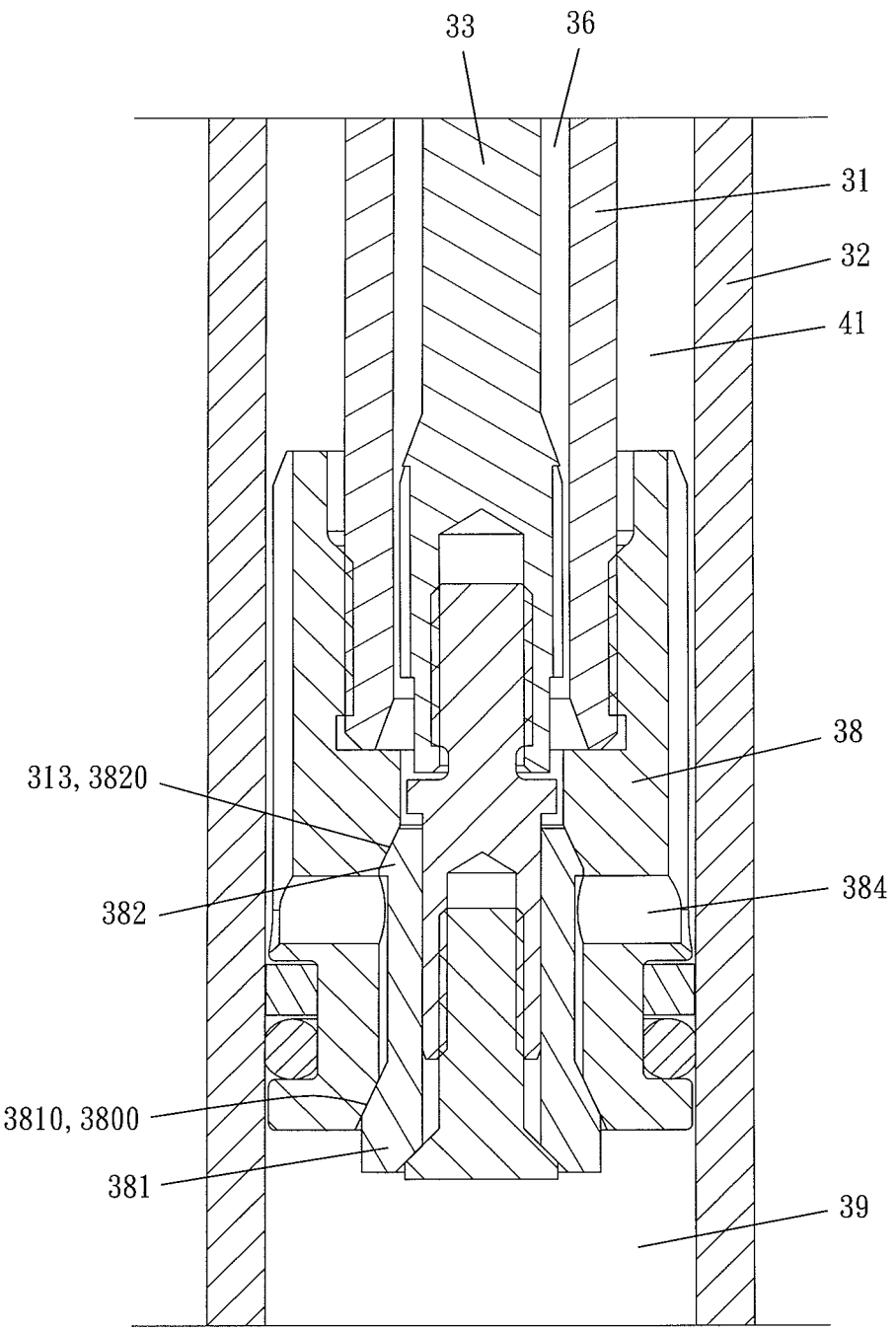
FIG. 20 is a sectional view of the lower half of the hydraulic actuator in a state that the oil passages are closed in accordance with a fifth embodiment of the present invention.
Figure 21:
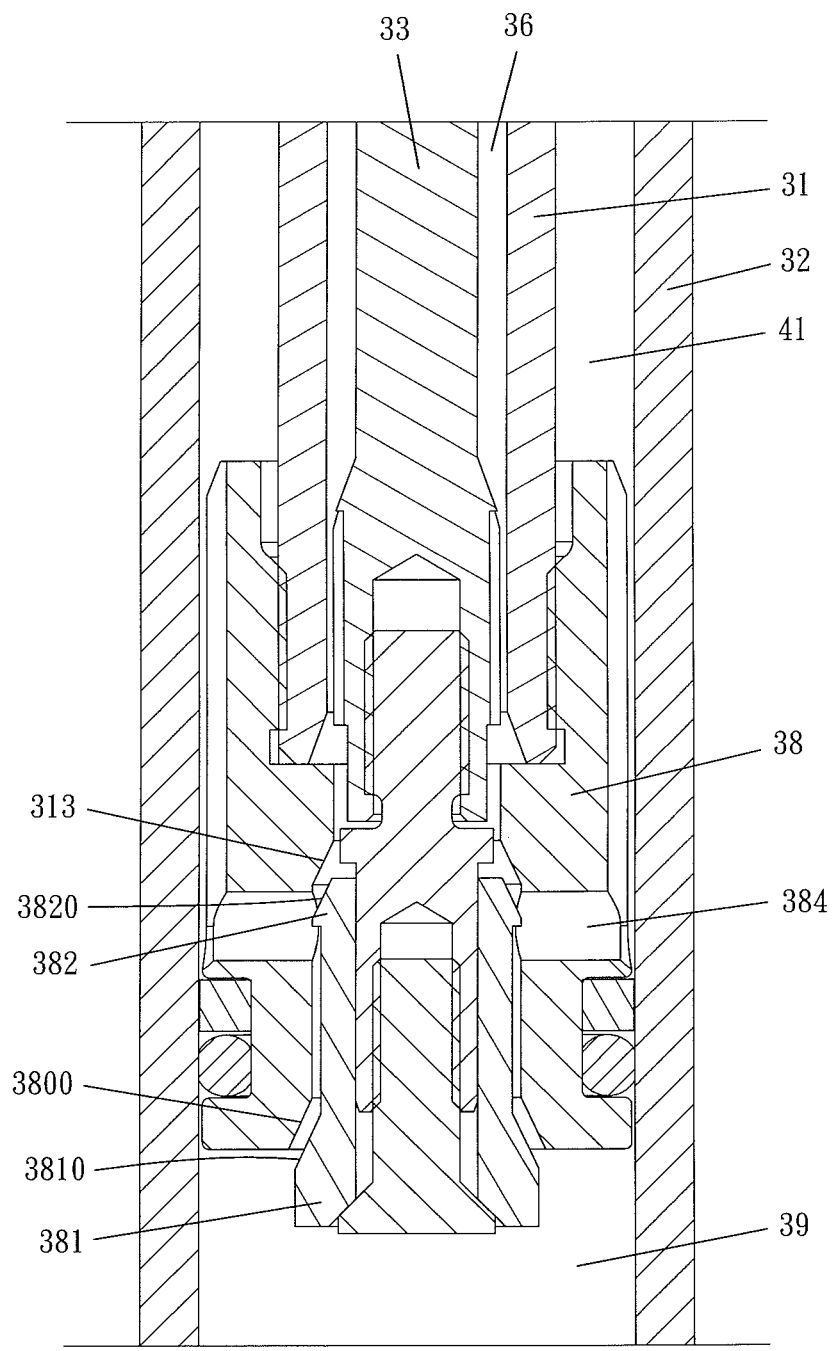
FIG. 21 is a sectional view of the lower half of the hydraulic actuator in a state that the oil passages communicate with one another in accordance with a fifth embodiment of the present invention.

Referring to FIG. 16 and FIG. 17, the sectional view of the lower half of the hydraulic actuator in a state that the oil passages are closed and the sectional view of the lower half of the hydraulic actuator in a state that the oil passages communicate with one another are illustrated in accordance with a third embodiment of the present invention; referring to FIG. 18 and FIG. 19, the sectional view of the lower half of the hydraulic actuator in a state that the oil passages are closed and the sectional view of the lower half of the hydraulic actuator in a state that the oil passages communicate with one another are illustrated in accordance with a fourth embodiment of the present invention; referring to FIG. 20 and FIG. 21, the sectional view of the lower half of the hydraulic actuator in a state that the oil passages are closed and the sectional view of the lower half of the hydraulic actuator in a state that the oil passages communicate with one another are illustrated in accordance with a fifth embodiment of the present invention. Said third, fourth and fifth embodiments of the present invention are NOT configured with a lower spring 40, wherein the upper valve 382 disclosed in said third embodiment is an 0-ring, and the outer surface of the pin 33 relative to the portion arranged with the upper valve 382 is provided with an upper ringed-recess 334 for receiving and fastening the upper valve 382 of which the outer surface projects from the outer surface of the pin 33. When the pin is in a state of locking, the outer wall of the upper valve 382 touches and kisses the inner wall of the intermediate cylinder barrel 31 above the valve aperture 384; the inner wall of the hollow valve 38 relative to the portion arranged with the lower valve 381 is provided with a lower ringed-recess 385 for receiving and engaging the outer surface of the lower valve 381 which is also an O-ring and of which the inner surface projects from the lower ringed-recess 385. The outer wall of the bottom of the pin 33 provides a vertical face 335 having a wider outer diameter than the pin body; the outer surface of the pin 33 above the vertical face 335 is provided with an arc concave surface 336 with a narrower outer diameter. When the oil passages are closed, as shown in FIG. 16, the pin 33 is pulled up by the upper spring 34 so as to allow the vertical face 335 of the pin 33 to engage with the inner surface of the lower valve 381 to close the intermediate oil compartment 41 and the lower oil compartment 39; said upper valve 382 will be pulled up by the pin 33 so as to allow the outer wall of the valve 382 to kiss the inner wall of the intermediate cylinder barrel 31 to close the oil passages between the intermediate oil compartment 41 and the upper oil compartment 36; thus, the oil within the intermediate oil compartment 41 may prevent the valve 38 from moving up or down so as to stop the seat moving up or down and enable the seat to be firmly combined with the bicycle frame as a whole. As shown in FIG. 18 and FIG. 19, the structure is illustrated in accordance with a fourth embodiment of the present invention. The difference between said fourth and said third embodiments is described as the following; the structure of the lower valve 381 disclosed in said fourth embodiment is identical to that disclosed in said first embodiment of the present invention, except that the lower valve 381, of which the outer surface is the outer incline 3810, is secured to the outer side of the bottom end of the pin 33 and that the hollow opening of the bottom end of the valve 38 relative to the inner wall of the outer incline 3810 is provided with an inner incline 3800, so that the intermediate oil compartment 41 and the lower oil compartment 39 will be closed when the inner incline 3800 kisses the outer incline 3810. As shown in FIG. 20 and FIG. 21, the structure of a fifth embodiment of the present invention is disclosed. According to said fifth embodiment of the present invention, the upper valve 382 and the lower valve 381 are one-piece formed, provided with a hollow tubular structure, and secured to the outer side of the bottom end of the pin 33; the outer side of the upper valve 382 and the external side of the lower valve 381 respectively provide the outer inclines 3820 and 3810 which may firmly engage with the inner inclines 313 and 3800 disposed to the valve 38, so as to disconnect the upper oil compartment 36, the intermediate oil compartment 41 and the lower oil compartment 39 when the pin 33 is in a state of locking.

What we claimed is:

1. A bicycle seat post structure, comprising:

an outer tube having a bottom end inserted into an inner tube arranged within the outer tube, and a hydraulic actuator configured in said outer tube and said inner tube;

wherein said hydraulic actuator includes an upper cylinder barrel having two ends respectively disposed with a sealing plug, a lower cylinder barrel having two ends respectively disposed with a sealing plug, an intermediate cylinder barrel arranged between said upper cylinder barrel and said lower cylinder barrel and having two ends respectively inserted into said upper cylinder barrel and said lower cylinder barrel, and a pin arranged in said intermediate cylinder barrel;

wherein a floating piston is configured between said upper cylinder barrel and said intermediate cylinder barrel, and wherein an air compartment is arranged above said floating piston and an upper oil compartment is arranged under said floating piston and between said upper cylinder barrel and said intermediate cylinder barrel;

wherein the interspace between said pin and said intermediate cylinder barrel is provided with an oil passage, wherein the wall of said intermediate cylinder barrel relative to the upper oil compartment is configured with an oil hole so as to allow the oil passage to communicate with the upper oil compartment, and wherein the outer wall of the pin relative to the portion above said oil hole is arranged with an oil ring so as to allow the oil ring to touch the inner wall of the intermediate cylinder barrel;

wherein said pin has a top end passing through the top end of the upper cylinder barrel and a bottom end passing through the bottom end of the intermediate cylinder barrel;

wherein the top end of said intermediate cylinder barrel is secured to the bottom end of a bearer fixed inside the upper cylinder barrel, wherein said bearer is provided with a receiving space at the middle thereof, wherein the interior of said receiving space is arranged with an upper spring disposed to the outer side of the pin, and wherein said upper spring has a top end fastened to a shoulder of the pin, so that said upper spring may exert a force on the pin so as to allow the pin to be pulled up;

wherein the bottom end of said intermediate cylinder barrel inside the lower cylinder barrel is disposed with a hollow valve, and wherein the outer wall of said hollow valve is arranged with an oil ring so as to allow the oil ring to touch the inner wall of the lower cylinder barrel;

wherein the bottom end of said pin is fastened with a lower valve, and said lower valve is pulled up by the force from the upper spring to touch and kiss the hollow opening of the bottom of said hollow valve so as to form a lower oil compartment positioned at the interior of the lower cylinder barrel under said lower valve;

wherein the interspace between said lower cylinder barrel and said intermediate cylinder barrel and also above the hollow valve is configured with an intermediate oil compartment, and wherein the wall of said hollow valve is disposed with a valve aperture which enables the intermediate oil compartment to communicate with the interior of the hollow valve;

wherein the oil passages among said intermediate oil compartment, the aforementioned pin and the intermediate cylinder barrel may communicate with one another;

characterized in that the outer side of the pin between the upper oil compartment and the lower oil compartment is fastened with an upper valve inside the hollow valve, and said upper valve may move simultaneously with the pin so that said upper valve may close the oil passage above the valve aperture to disconnect said upper oil compartment from said intermediate oil compartment when the pin is in a state of locking.

2. The bicycle seat post structure as claimed in claim 1, wherein said upper valve is configured to the outer side of the diameter-narrowed section of said pin, wherein said upper valve is allowed to carry out axial displacements at the diameter-narrowed section, and wherein the bottom end of said upper valve is arranged with a lower spring having a top end touching the bottom end of the upper valve and a bottom end against a plane surface of the lower pin.

3. The bicycle seat post structure as claimed in claim 1, wherein said lower valve is configured to the outer side of the diameter-narrowed section of the bottom end of the pin, and wherein the bottom of said lower valve is held by a lower spring which may exert a force on the lower valve so as to allow said lower spring to push the lower valve up.

4. The bicycle seat post structure as claimed in claim 2, wherein the outer side of said upper valve and the outer side of said lower valve respectively kiss the relative surfaces arranged to the hollow valve, and both engage with each other by inclines.

5. The bicycle seat post structure as claimed in claim 3, wherein the outer side of said upper valve and the outer side of said lower valve respectively kiss the relative surface arranged to the hollow valve, and both engage with each other by inclines.

6. The bicycle seat post structure as claimed in claim 1, wherein said upper valve and said lower valve are provided with a structure of O-ring, and the outer surface of said pin relative to the portion arranged with the upper valve is disposed with an upper ringed-recess for receiving and fastening the inner surface of the upper valve, wherein the outer surface of the upper valve projects from the outer wall of the pin, and wherein the outer wall of said upper valve touches and kisses the inner wall of the intermediate cylinder barrel above the valve aperture when the pin is in a state of locking; wherein the inner wall of said hollow valve relative to the portion arranged with the lower valve is provided with a lower ringed-recess for receiving and fastening the outer surface of the lower valve of which the inner surface projects from the lower ringed-recess; and wherein the outer wall of the bottom of the pin provides a vertical face having a wider outer diameter than the pin body, and wherein the outer surface of the pin above the vertical face is provided with an arc concave surface with a narrower outer diameter.

7. The bicycle seat post structure as claimed in claim 1, wherein said upper valve is an O-ring, the outer surface of said pin relative to the portion arranged with the upper valve is disposed with an upper ringed-recess for receiving and fastening the inner surface of the upper valve, wherein the outer surface of the upper valve projects from the outer wall of the pin, and wherein the outer wall of said upper valve touches and kisses the inner wall of the intermediate cylinder barrel above the valve aperture when the pin is in a state of locking; and wherein said lower valve is secured to the exterior of the lower end of the pin, wherein the outer side of said lower valve is the outer incline, and wherein the inner wall of the opening of the hollow valve bottom relative to the outer incline is provided with an inner incline.

8. The bicycle seat post structure as claimed in claim 1, wherein said upper valve and said lower valve are one-piece formed, provided with a hollow tubular structure, and secured to the outer side of the bottom end of the pin; and wherein the outer side of said upper valve and the external side of said lower valve respectively provide an outer incline which may firmly engage with the relative inner incline disposed to the hollow valve so as to disconnect the upper oil compartment, the intermediate oil compartment and the lower oil compartment when the pin is in a state of locking.

* * * * *